United States Patent
Kast et al.

(10) Patent No.: US 11,702,974 B2
(45) Date of Patent: Jul. 18, 2023

(54) EXHAUST GAS/REACTANT MIXING DEVICE

(71) Applicant: Purem GmbH, Neunkirchen (DE)

(72) Inventors: Peter Kast, Esslingen (DE); Heike Többen, Uhingen (DE); Philipp Weinmann, Esslingen (DE); Oleksander Vyelyayev, Stuttgart (DE); Tobias Wolf, Köngen (DE); Mathias Rothfuss, Waiblingen (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 17/723,125

(22) Filed: Apr. 18, 2022

(65) Prior Publication Data
US 2022/0333521 A1    Oct. 20, 2022

(30) Foreign Application Priority Data
Apr. 19, 2021   (DE) .................. 10 2021 109 777.0

(51) Int. Cl.
| | |
|---|---|
| *F01N 3/28* | (2006.01) |
| *F01N 3/035* | (2006.01) |
| *F01N 3/20* | (2006.01) |

(52) U.S. Cl.
CPC .......... *F01N 3/2892* (2013.01); *F01N 3/035* (2013.01); *F01N 3/2066* (2013.01);
(Continued)

(58) Field of Classification Search
CPC ...... F01N 3/035; F01N 3/2066; F01N 3/2892; F01N 2240/20; F01N 2250/02; F01N 2260/06; F01N 2610/02; F01N 2610/1453
See application file for complete search history.

(56) References Cited

U.S. PATENT DOCUMENTS

| | | | |
|---|---|---|---|
| 2016/0131007 A1 | 5/2016 | Kauderer et al. | |
| 2019/0017426 A1* | 1/2019 | Zhang | ............ B01F 23/10 |

(Continued)

FOREIGN PATENT DOCUMENTS

| | | | |
|---|---|---|---|
| DE | 10 2015 005 689 B3 | 3/2016 | |
| DE | 10 2014 222 698 A1 | 5/2016 | |

(Continued)

*Primary Examiner* — Audrey B. Walter
(74) *Attorney, Agent, or Firm* — Walter Ottesen, P.A.

(57) ABSTRACT

An exhaust gas/reactant mixing arrangement for an exhaust system of an internal combustion engine mixes exhaust gas and reactant. The mixing arrangement includes an exhaust gas guide housing defining a longitudinal axis and having a housing wall. An exhaust gas duct is surrounded by the housing wall and exhaust gas can flow therethrough. A mixing zone has a mixing chamber formed between an upstream end wall and a downstream end wall and a reactant dispensing arrangement is supported on the exhaust gas guide housing. The reactant dispensing arrangement dispenses reactant into the mixing chamber along a reactant dispensing line in a dispensing direction. A mixture flow path leads from an inflow opening to an outflow opening and is formed in the mixing chamber. The mixture flow path has two flow deflection regions, which follow one another in a mixture flow direction and have mutually opposite flow deflection directions.

16 Claims, 2 Drawing Sheets

(52) U.S. Cl.
CPC ...... *F01N 2240/20* (2013.01); *F01N 2250/02* (2013.01); *F01N 2260/06* (2013.01); *F01N 2610/02* (2013.01); *F01N 2610/1453* (2013.01)

(56) References Cited

U.S. PATENT DOCUMENTS

| | | |
|---|---|---|
| 2020/0032692 A1 | 1/2020 | Wang et al. |
| 2020/0131974 A1 | 4/2020 | Wang et al. |
| 2020/0408131 A1 | 12/2020 | Kurpejovic et al. |

FOREIGN PATENT DOCUMENTS

| | | |
|---|---|---|
| DE | 10 2019 210 877 A1 | 1/2020 |
| DE | 10 2019 117 459 A1 | 12/2020 |

\* cited by examiner

EXHAUST GAS/REACTANT MIXING DEVICE

CROSS REFERENCE TO RELATED APPLICATION

This application claims priority of German patent application no. 10 2021 109 777.0, filed Apr. 19, 2021, the entire content of which is incorporated herein by reference.

TECHNICAL FIELD

The present disclosure relates to an exhaust gas/reactant mixing arrangement for an exhaust system of an internal combustion engine, for example in a vehicle, via which the exhaust gas emitted by the internal combustion engine can be mixed efficiently with reactant injected into the exhaust gas, for example a urea/water solution.

BACKGROUND

To reduce the nitrogen oxide content of exhaust gas emitted by a diesel internal combustion engine, one known practice is to carry out a selective catalytic reduction in an SCR catalytic converter arrangement. For this purpose, a reactant, for example, a urea/water solution, is injected into the exhaust gas upstream of the SCR catalytic converter arrangement. Before being introduced into the SCR catalytic converter arrangement, the exhaust gas and the reactant must be efficiently mixed. In this context, there is the problem that, for example as a result of condensation of the reactant, which is generally injected in liquid form, liquid reactant can accumulate and form deposits on an inner surface of a housing carrying the exhaust gas flow. Inadequate mixing of the exhaust gas and the reactant can furthermore lead to some of the liquid reactant reaching the SCR catalytic converter arrangement and thus essentially not being available for efficient execution of a catalytic reaction. The risk of inadequate mixing of reactant and exhaust gas exists above all if, to ensure a compact construction of an exhaust system, the distance between the location at which the reactant is injected, for example, substantially orthogonally to the exhaust gas flow, and the SCR catalytic converter arrangement is comparatively small in the direction of flow.

SUMMARY

It is an object of the present disclosure to provide an exhaust gas/reactant mixing arrangement which, while being of compact configuration, ensures efficient mixing of the exhaust gas and the reactant.

According to the disclosure, this object can, for example, be achieved by an exhaust gas/reactant mixing arrangement for an exhaust system of an internal combustion engine for mixing exhaust gas and reactant, wherein the exhaust gas/reactant mixing arrangement includes:
  an exhaust gas guide housing extending in the direction of
    a housing longitudinal axis and having a housing wall,
    wherein an exhaust gas duct, which is surrounded by
    the housing wall and through which exhaust gas can
    flow, is formed in the exhaust gas guide housing,
  a mixing zone having a mixing chamber formed between
    an upstream end wall and a downstream end wall
    arranged downstream with respect to the upstream end
    wall,
  a reactant dispensing arrangement, supported on the
    exhaust gas guide housing, for dispensing reactant into
    the mixing chamber substantially along a reactant dispensing line in a main reactant dispensing direction,
wherein at least one first inflow opening is provided in the upstream end wall, wherein a region of the exhaust gas duct which is located upstream with respect to the upstream end wall is open to the mixing chamber via the at least one first inflow opening, wherein at least one first outflow opening is provided in the downstream end wall, wherein the mixing chamber is open via the at least one first outflow opening to a region of the exhaust gas duct which is located downstream with respect to the downstream end wall, wherein the at least one first outflow opening and the at least one first inflow opening are offset with respect to one another transversely with respect to the housing longitudinal axis and substantially do not overlap one another, wherein a mixture flow path leading from the at least one first inflow opening to the at least one first outflow opening is formed in the mixing chamber, wherein the mixture flow path has two flow deflection regions following one another in a mixture flow direction and having mutually opposite flow deflection directions. In this case, for example, the at least one first outflow opening and the at least one first inflow opening can be offset with respect to one another transversely with respect to the housing longitudinal axis and can be arranged in such a way that they substantially do not overlap one another.

In the exhaust gas/reactant mixing arrangement constructed according to the disclosure, efficient mixing of the exhaust gas and reactant is achieved by the multiple redirection or deflection of the mixture flow including exhaust gas and reactant as it flows through the mixture flow path in mutually opposite flow deflection directions, owing to the swirling and turbulence which occurs in the mixture flow during this process. Also contributing to this is that, as a result of the structure of the mixture flow path, the cross-sectional area of the exhaust gas guide housing which is available for through flow is utilized efficiently.

The mixture flow path can include the following successively in the mixture flow direction:
  a mixture producing region, wherein, in order to produce
    a mixture of exhaust gas and reactant in the mixture
    producing region, the at least one first inflow opening
    is open to the mixture producing region, and the
    reactant dispensing arrangement dispenses reactant into
    the mixture producing region,
  a first flow deflection region following the mixture producing region in the mixture flow direction, wherein
    the mixture of exhaust gas and reactant flowing from
    the mixture producing region to the first flow deflection
    region is deflected in a first flow deflection direction in
    the first flow deflection region,
  a second flow deflection region following the first flow
    deflection region in the mixture flow direction, wherein
    the mixture of exhaust gas and reactant flowing from
    the first flow deflection region to the second flow
    deflection region is deflected in a second flow deflection direction opposite the first flow deflection direction
    in the second flow deflection region,
  a mixture dispensing region following the second flow
    deflection region in the mixture flow direction and
    leading to the at least one first outflow opening.

In order to achieve the desired flow guidance in the mixing chamber and to be able to provide the various regions of the mixture flow path for this purpose, the mixture producing region can be delimited substantially between a first partition wall, which extends between the upstream end wall and the downstream end wall, and a second partition wall, which extends between the upstream end wall and the downstream end wall, wherein the at least one first inflow opening is arranged between the first partition wall and the second partition wall, and the first partition wall shields the at least one first outflow opening from direct inflow from the at least one first inflow opening.

For effective flow guidance, the first partition wall, starting from the housing wall, can extend between the at least one first inflow opening and the at least one first outflow opening, or/and the first partition wall can provide a first flow deflection wall of the first flow deflection region.

To provide the intended flow guidance, it is furthermore possible to provide a third partition wall, which extends between the upstream end wall and the downstream end wall, wherein the third partition wall provides a flow deflection wall of the second flow deflection region or/and delimits the mixture dispensing region together with the first partition wall.

The third partition wall can extend along a circumferential region of the housing wall at a radial distance from the housing wall, wherein the third partition wall, together with the housing wall, delimits an exhaust gas flow space. Via this exhaust gas flow space, the mixing chamber is shielded in some region or regions with respect to the housing wall, thus making it possible to substantially eliminate the risk of a mixture of exhaust gas and reactant striking the housing wall condensing or precipitating on the housing wall, which is cold particularly in a starting phase of operation of an internal combustion engine.

In order to achieve complete fluidic decoupling of the mixing chamber from the exhaust gas flow space, it is proposed that the exhaust gas flow space is separated from the mixing chamber by the third partition wall, that at least one second inflow opening is provided in the upstream end wall, wherein that region of the exhaust gas duct which is located upstream with respect to the upstream end wall is open to the exhaust gas flow space via the at least one second inflow opening, and that at least one second outflow opening is provided in the downstream end wall, wherein the exhaust gas flow space is open to that region of the exhaust gas duct which is located downstream with respect to the downstream end wall via the at least one second outflow opening.

In this case, in order for exhaust gas to flow efficiently through the exhaust gas flow space, it is possible for the at least one second outflow opening and the at least one second inflow opening to be offset with respect to one another transversely with respect to the housing longitudinal axis and substantially not to overlap one another.

In an alternative configuration, the exhaust gas flow space can be open in a first circumferential region to the mixture producing region and can be open in a second circumferential end region to the mixture dispensing region or/and the at least one first outflow opening. In this case, therefore, some of the exhaust gas introduced into the mixing zone is not passed into the mixing chamber but into the exhaust gas flow space in order thereby to achieve thermal decoupling of the third partition wall from the housing wall or to heat the third partition wall on its side facing away from the mixture flow path.

For a structure which is simple to implement, the third partition wall can here be formed integrally with the second partition wall.

For efficient utilization of the available volume for mixing exhaust gas and reactant, the mixture flow path can have a substantially S-shaped structure.

In order to also be able to pass comparatively large volume flows through the mixing zone, it is proposed that a plurality of first outflow openings which follow one another in the circumferential direction is provided.

In this case, a cross-sectional dimension of the first outflow openings can decrease in the direction away from the mixture dispensing region.

Efficient mixing of the exhaust gas and the reactant even as these two media are brought together can be promoted by arranging the reactant dispensing arrangement in such a way with respect to the at least one first inflow opening that the reactant dispensing line extends across the at least one first inflow opening. Furthermore, a compact configuration with a comparatively long flow path can be achieved by arranging the reactant dispensing arrangement in such a way with respect to the at least one first inflow opening that the reactant dispensing line does not intersect the housing longitudinal axis, that is, the line is arranged so as to be askew with respect to the housing longitudinal axis, for example.

The disclosure furthermore relates to an exhaust system for an internal combustion engine, including an exhaust gas/reactant mixing arrangement constructed according to the disclosure and, downstream of the exhaust gas/reactant mixing arrangement, an SCR catalytic converter arrangement.

By virtue of the very compact construction of the exhaust gas/reactant mixing arrangement according to the disclosure in the main exhaust gas flow direction, this arrangement is particularly suitable for a construction in which an exhaust gas treatment unit, preferably a particle filter arrangement, is arranged upstream with respect to the exhaust gas/reactant mixing arrangement. In particular, the various system regions including the exhaust gas treatment unit, the exhaust gas/reactant mixing arrangement and the SCR catalytic converter arrangement can here be arranged substantially linearly in succession in the main exhaust gas flow direction.

BRIEF DESCRIPTION OF THE DRAWINGS

The invention will now be described with reference to the drawings wherein.

DESCRIPTION OF THE PREFERRED EMBODIMENTS

Figure 1:
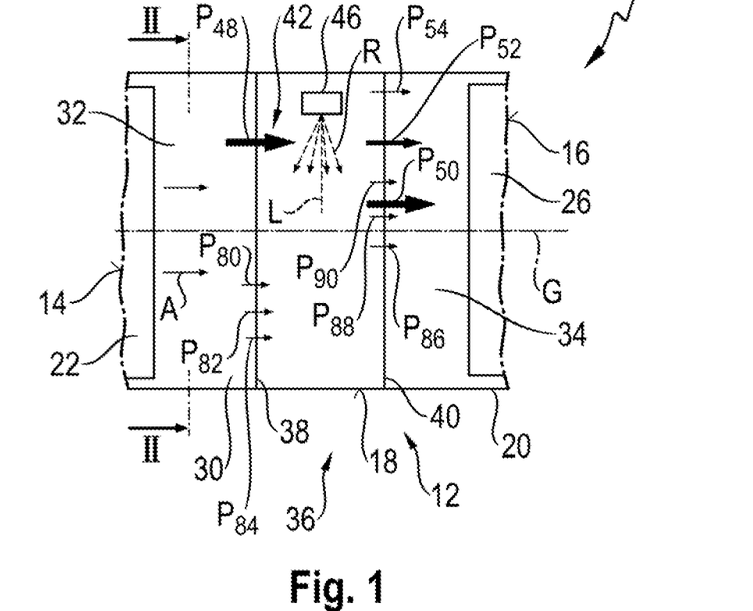
FIG. 1 shows a diagrammatic longitudinal sectional view of an exhaust system having an exhaust gas/reactant mixing arrangement.

FIG. 1 illustrates a section of an exhaust system, denoted overall by 10, of an internal combustion engine, for example, in a vehicle. As a central component, this exhaust system 10 includes an exhaust gas/reactant mixing arrangement 12, which can be arranged in the exhaust system 10, for example, downstream of a particle filter arrangement 14 and upstream of an SCR catalytic converter arrangement 16.

The exhaust gas/reactant mixing arrangement 12 includes, for example, a tubular exhaust gas guide housing 18, which is elongate in the direction of a housing longitudinal axis G and has a housing wall 20, which is substantially cylindrical and, for example, has a circular cross section. The particle filter arrangement 14 can be supported in this exhaust gas guide housing 18 upstream with respect to the exhaust gas/reactant mixing arrangement 12. For example, the particle filter arrangement 14 can include a monolithically constructed particle filter block 22, which is wrapped by a fiber mat or the like and supported in the exhaust gas guide housing 18. The SCR catalytic converter arrangement 16 arranged downstream of the exhaust gas/reactant mixing arrangement 12 can also be supported in the exhaust gas guide housing 18 and can include, for example, a monolithically constructed catalytic converter block 26, which can be supported in the exhaust gas guide housing 18 by a fiber mat or the like surrounding the block.

It should be noted that the exhaust system 10 or the exhaust gas guide housing 18 can be subdivided into a plurality of segments which follow one another in a main exhaust gas flow direction A and are, for example, connected to one another, of which, for example, one of the segments can contain the particle filter arrangement 14, one of the segments can contain or provide the exhaust gas/reactant mixing arrangement 12 described in detail below, and one of the segments can contain the SCR catalytic converter arrangement 16.

An exhaust gas duct 30, through which exhaust gas can flow substantially in the main exhaust gas flow direction A, is formed in the exhaust gas guide housing 18, wherein the exhaust gas duct 30 has a duct region 32, which is located upstream with respect to the exhaust gas/reactant mixing arrangement 12, and a duct region 34, which is located downstream with respect to the exhaust gas/reactant mixing arrangement 12.

A mixing zone 36 is delimited in the upstream direction, that is, toward duct region 32, by an upstream end wall 38. Furthermore, the mixing zone 36 is delimited in the downstream direction, that is, toward duct region 34, by a downstream end wall 40 arranged offset with respect to the upstream end wall 38 in the downstream direction along the housing longitudinal axis G.

In the direction of the housing longitudinal axis G, a mixing chamber 42 of the mixing zone 36 is formed between the two end walls 38, 40, which are arranged parallel to one another and orthogonally to the housing longitudinal axis G, for example. Furthermore, a reactant dispensing arrangement 46, also referred to in general as an injector, is provided in association with the mixing zone 36, which reactant dispensing arrangement is supported, for example via a stub, on the housing wall 20 of the exhaust gas guide housing 18 and is configured to dispense a reactant R, for example, a urea/water solution, into the mixing zone 36 in a main reactant dispensing direction H, for example, in the form of a spray cone. In this case, the main reactant dispensing direction H can be oriented along a reactant dispensing line L, which can lie in a plane which is orthogonal with respect to the housing longitudinal axis G. The main reactant dispensing direction H or the reactant dispensing line L can correspond, for example, to the center line of a spray cone of the reactant R dispensed by the reactant dispensing arrangement 46.

A first inflow opening 48 is formed in the upstream end wall 38 eccentrically with respect to the housing longitudinal axis G. As indicated by a flow arrow $P_{48}$, exhaust gas can enter the mixing chamber 42 from duct region 32 through the first inflow opening 48.

In the downstream end wall 40, three first outflow openings 50, 52, 54 are provided in succession in the circumferential direction, through which a mixture of exhaust gas and reactant R can flow out of the mixing chamber 42 into duct region 34, as indicated in FIG. 1 by flow arrows $P_{50}$, $P_{52}$, $P_{54}$. In this case, the thickness of the flow arrows $P_{48}$, $P_{50}$, $P_{52}$, $P_{54}$ visible in FIG. 1 represents in each case the volume flow passed through a respective inflow or outflow opening and thus also their cross-sectional area.

Figure 2:
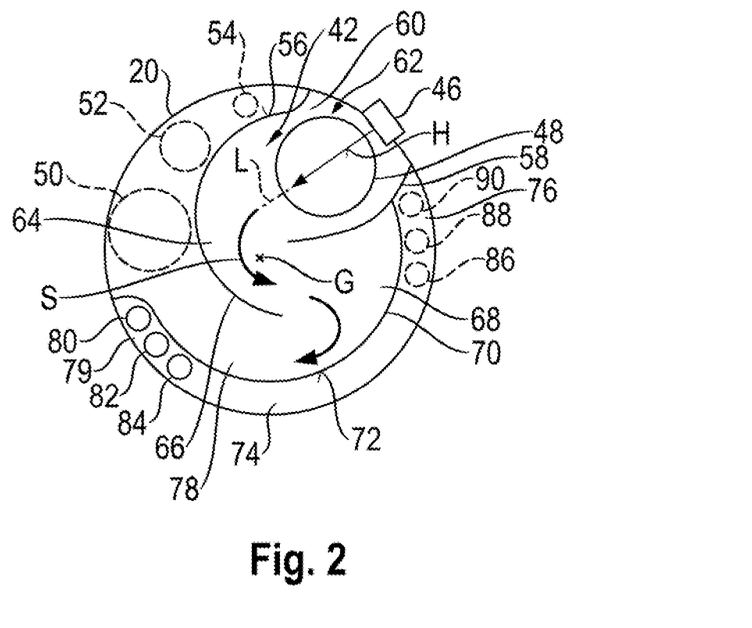
FIG. 2 shows a diagrammatic cross-sectional view of the exhaust system of FIG. 1, sectioned along a line II-II in FIG. 1.

In the mixing zone 36, first and second partition walls 56, 58 extending substantially in the direction of the housing longitudinal axis G are provided between the end walls 38, 40. Starting from the housing wall 20, the first partition wall 56 extends into the mixing chamber 42 between the first inflow opening 48, which is provided in the upstream end wall 38, and the first outflow openings 50, 52, 54, which are provided in the downstream end wall 40. Here, the first partition wall 56 extends in the circumferential direction along the inside of the housing wall 20 with increasing radial spacing therefrom and surrounds the first inflow opening 48 in the circumferential direction with a likewise increasing spacing therefrom.

The second partition wall 58, likewise starting from the housing wall 20, extends on the other circumferential side of the first inflow opening 48 and surrounds the latter in a partial region of its circumference.

Between the first partition wall 56 and the second partition wall 58, which in their axial end regions adjoin the end walls 38, 40 and can be connected to the latter, for example by a material connection, and in their end region adjoining the housing wall 20 can be attached to the housing wall 20, a mixture producing region 60 of a mixture flow path, which is denoted in a general way by 62 and leads from the first inflow opening 48 to the first outflow openings 50, 52, 54, is formed. In the mixture producing region 60, exhaust gas enters the mixing chamber 42 from duct region 32. Likewise, the reactant R is injected along the reactant dispensing line L into the mixture producing region 60. FIG. 2 clearly shows that the reactant dispensing line L extends substantially transversely across the first inflow opening 48, with the result that the reactant R dispensed by the reactant dispensing arrangement 46 is caught substantially directly by the exhaust gas flow flowing through the first inflow opening 48 and is already mixed with the latter as a result.

The mixture of exhaust gas and reactant R produced in the mixture producing region 60 then flows out of the mixture producing region 60 along the mixture flow path 62 to a first flow deflection region, which is denoted in a general way by 64. The first flow deflection region 64 includes, as an essential component, a section of the first partition wall 56 which extends in an arcuate manner around the first inflow opening 48, the section providing a first flow deflection wall 66. In the first flow deflection region 64, the mixture of exhaust gas and reactant R produced in the mixture producing region 60 strikes the first flow deflection wall 66 provided by a section of the first partition wall 56 and is thus deflected in a first deflection direction for flow along the mixture flow path 62 in a mixture flow direction S. In the illustration of FIG. 2, this is a deflection to the left when viewed in the mixture flow direction S.

The first deflection region 64 is followed in the mixture flow direction R by a second flow deflection region 68. The second flow deflection region 68 is provided substantially by a section of a third partition wall, denoted in a general way by 72, which provides a second flow deflection wall 70. The third partition wall 72 too extends in the direction of the housing longitudinal axis G between the two end walls 38, 40 and can be attached thereto, for example via a material connection. In one of its circumferential end regions, the third partition wall 72 adjoins the second partition wall 58, with the result that an exhaust gas flow space 74 formed between the third partition wall 72 and the housing wall 20 is closed off by the second partition wall 58 in a first circumferential end region 76. In its second circumferential end region 79, the exhaust gas flow space 74 is closed off by the third partition wall 72, which is extended radially outward as far as the housing wall 20, with the result that, fundamentally, substantially complete fluidic separation of the exhaust gas flow space 74 from the mixing chamber 42 is achieved.

The mixture of exhaust gas and reactant conducted out of the first flow deflection region 64 into the second flow deflection region 68 is deflected in the second flow deflection region 68 by the second flow deflection wall 70 in a second flow deflection direction opposite the first deflection direction in the first flow deflection region 64 and conducted into a mixture dispensing region formed between the first partition wall 56, in particular also that of the first flow deflection wall 66 thereof, and the third partition wall 72. This deflection in the second flow deflection direction also takes place, in particular, because the second flow deflection region 68 is delimited by the second partition wall 58 with respect to the mixture producing region 60, and it is thus not possible for the mixture of exhaust gas and reactant R to flow back into the mixture producing region 60 after flowing through the first flow deflection region 64. In the illustration of FIG. 2, the deflection in the second flow deflection direction is a deflection to the right, when viewed in the mixture flow direction S.

The mixture of exhaust gas and reactant R flowing through the mixture dispensing region 78 then passes into the region of the first outflow openings 50, 52, 54, which have a decreasing cross-sectional dimension, for example, a decreasing diameter, in the mixture flow direction S in accordance with the changing radial spacing of the first partition wall 56 with respect to the housing wall 20.

Second inflow openings 80, 82, 84 are provided in succession in the circumferential direction in the upstream end wall 38 in association with the exhaust gas flow space 74. As indicated by flow arrows $P_{80}$, $P_{82}$, $P_{84}$ in FIG. 1, exhaust gas enters the exhaust gas flow space 74 from duct region 32 through these second inflow openings 80, 82, 84 and flows in the circumferential direction from the second circumferential end region 79 to second outflow openings 86, 88, 90 provided in the first circumferential end region 76 in the downstream end wall 40. As indicated by flow arrows $P_{86}$, $P_{88}$, $P_{90}$ in FIG. 1, that part of the exhaust gas flow which flows through the exhaust gas flow space 74 leaves the mixing zone 36 toward duct region 34.

By providing the exhaust gas flow space 74 delimited by the third partition wall 72 with respect to the mixture flow path 62, direct contact of the flow of exhaust gas and reactant R with the housing wall 20 is very largely avoided. The deflection of the mixture flow of exhaust gas and reactant R as it flows in the mixture flow direction S along the mixture flow path 62 takes place in the two flow deflection regions 64, 68 at flow deflection walls 66, 70, which are at a distance from the housing wall 20 and around which exhaust gas or a mixture of exhaust gas and reactant R flows on both sides during operation. This is advantageous particularly in the starting mode since the risk that reactant R will condense on the comparatively cold housing wall 20 can thereby be very largely ruled out. Only in the region in which the mixture flow of exhaust gas and reactant R moves out of the mixture dispensing region 78 to the first outflow openings 50, 52, 54 can the mixture flow come into contact with the inner surface of the housing wall 20. However, efficient mixing or evaporation of the reactant R has already been achieved in this region, and therefore there is no risk of condensation of reactant R on the inside of the housing wall 20 in this region.

FIG. 2 shows that the mixture flow path 62 has a curved, substantially S-shaped structure between the first inflow opening 48 and the first outflow openings 50, 52, 54. In order to be able to achieve this in the limited cross section of the exhaust gas guide housing 18, the main reactant dispensing direction H or the reactant dispensing line L is oriented in such a way that it runs askew with respect to the housing longitudinal axis L and does not intersect the latter. Nevertheless, as can be seen in FIG. 1, the reactant dispensing line L can lie in a plane substantially orthogonal to the housing longitudinal axis G. The oblique or tangential introduction of the reactant R makes it possible to arrange the mixture flow path 62 with its S-shaped structure and comparatively large flow area in the mixing zone 36. At the same time, a direct flow connection between the first inflow opening 48 and the first outflow openings 50, 52, 54 is prevented by the positioning, in particular, of the first partition wall 56.

Figure 3:
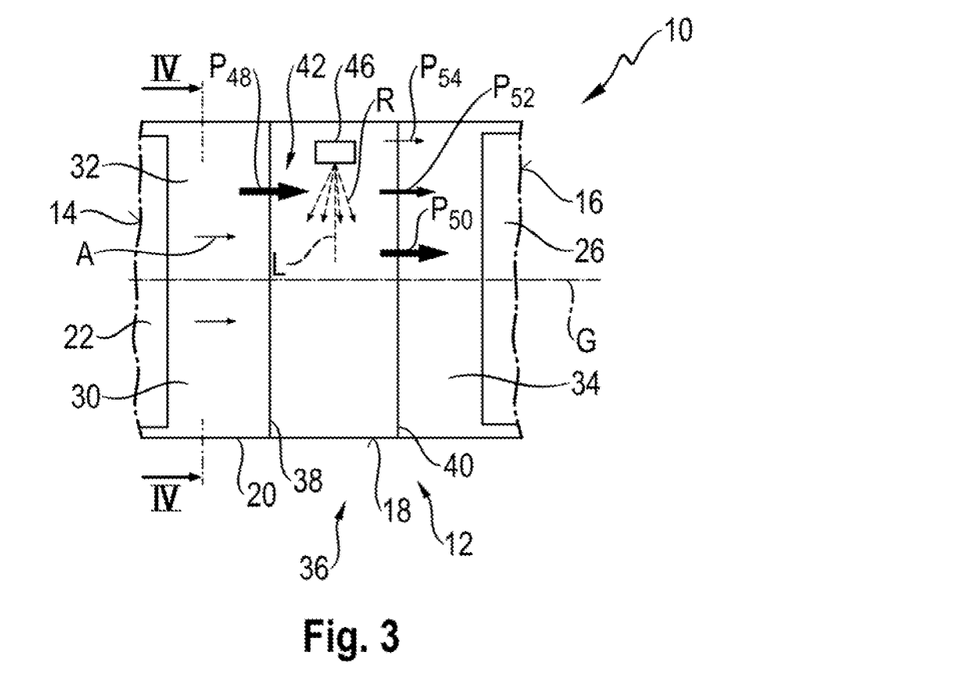
FIG. 3 shows a view corresponding to FIG. 1 of an alternative embodiment of an exhaust system having an exhaust gas/reactant mixing arrangement; and, FIG. 4 shows a diagrammatic cross-sectional view along a line IV-IV in FIG. 3 of the exhaust system of FIG. 3.
Figure 4:
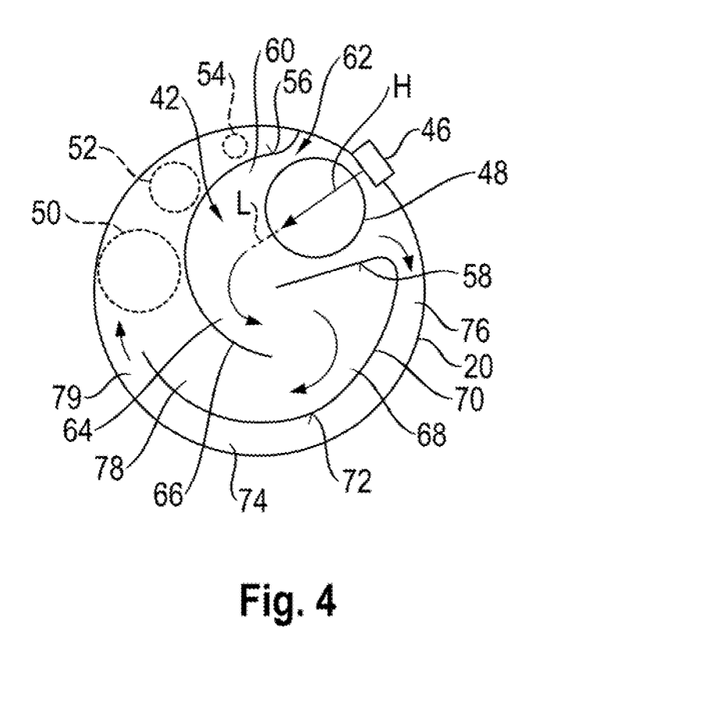

An alternative embodiment of such a mixing arrangement 12 is illustrated in FIGS. 3 and 4. Components which correspond to above-described components in terms of structure or function are denoted by the same reference characters and numerals.

The configuration of an exhaust gas/reactant mixing arrangement 12 illustrated in FIGS. 3 and 4 corresponds in essential aspects to the configuration described above with reference to FIGS. 1 and 2. In the following, therefore, it is essentially only the differences between the two embodiments which will be discussed.

It can be seen, particularly in FIG. 4 that, in this configuration, the exhaust gas flow space 74 is not separated from the mixing chamber 42 but is open to the latter in the two circumferential end regions 76, 79 of the space. In the first circumferential end region 76, the exhaust gas flow space 74 is open to the mixture producing region 60. In the second circumferential end region 79, the exhaust gas flow space is open to the mixture dispensing region 78 in the end region thereof leading to the first outflow openings 50, 52, 54 or is open to these first outflow openings 50, 52, 54. Some of the exhaust gas entering the mixing chamber 42 through the first inflow opening 48 flows through the open first circumferential end region 76 into the exhaust gas flow space 74 and, in the process, flows around the third partition wall 72 on its rear side facing away from the mixture flow path 62 and heats it or decouples it thermally from the housing wall 20. The exhaust gas flow through the exhaust gas flow space 74 leaves the latter in the second circumferential end region 79 and leaves the mixing zone 36 through the first outflow openings 50, 52, 54. Since, in this embodiment, there are no second inflow openings leading to the exhaust gas flow space 74 and no second outflow openings leading out of the exhaust gas flow space 74, the first inflow opening 48 forms the only inflow opening, while the first outflow openings 50, 52, 54 form the only outflow openings of this embodiment.

In order in this configuration to achieve a structure which is simple to implement, the third partition wall 72 and the second partition wall 58 can, as can be seen in FIG. 4, be constructed in one piece with one another and, like the first partition wall 56 or also the end walls 38, 40, can be constructed from sheet metal material.

In the case of the configuration illustrated in FIGS. 3 and 4 too, a configuration which is simple to implement is achieved, in which the curved structure of the mixture flow path 62 makes it possible to ensure efficient mixing of the exhaust gas and the reactant R over a comparatively long flow path.

It should be noted that, in various aspects of configuration, the embodiments described above can be configured differently. Thus, for example, the numbers of the various inflow openings or outflow openings can differ from the numbers illustrated. The cross-sectional geometry of these openings can also be a geometry which differs from the circular cross-sectional geometry illustrated, and the exhaust gas guide housing can also have a cross-sectional geometry which differs from the circular cross-sectional geometry illustrated.

It is understood that the foregoing description is that of the preferred embodiments of the invention and that various changes and modifications may be made thereto without departing from the spirit and scope of the invention as defined in the appended claims.

What is claimed is:

1. An exhaust gas/reactant mixing arrangement for an exhaust system of an internal combustion engine for mixing exhaust gas and reactant (R), the exhaust gas/reactant mixing arrangement comprising:
   an exhaust gas guide housing defining a housing longitudinal axis (G) and extending along said longitudinal axis (G);
   said exhaust gas guide housing having a housing wall;
   an exhaust gas duct for passing exhaust gas therethrough;
   said exhaust gas duct being formed in said exhaust gas guide housing and surrounded by said housing wall;
   said exhaust gas guide housing having an upstream end wall and a downstream end wall arranged downstream of said upstream end wall;
   a mixing zone having a mixing chamber formed between said upstream and downstream end walls;
   a reactant dispensing arrangement supported on said exhaust gas guide housing and configured to dispense said reactant (R) into said mixing chamber along a reactant dispensing line (L) in a main reactant dispensing direction (H);
   said upstream end wall having at least one first inflow opening provided therein;
   said exhaust gas duct having a first region located upstream of said upstream end wall and said first region being open to said mixing chamber via said at least one first inflow opening;
   said downstream end wall having at least one first outflow opening provided therein;
   said exhaust gas duct having a second region located downstream of said downstream end wall and said second region being open to said mixing chamber via said at least one first outflow opening;
   a mixture flow path formed in said mixing chamber to lead from said at least one first inflow opening to said at least one outflow opening;
   said mixture flow path being configured to have first and second flow deflection regions following one another in a mixture flow direction (S);
   said first and second flow directions being arranged to deflect in mutually opposite directions;
   wherein said mixture flow path is configured to comprise therealong successively in said mixture flow direction (S):
   a mixture producing region located so as to cause said at least one first inflow opening to open to said mixture producing region to facilitate producing a mixture of exhaust gas and reactant (R) therein;
   said reactant dispensing arrangement being mounted to dispense reactant (R) into said mixture producing region and being arranged with respect to said at least one first inflow opening so that said reactant dispensing line (L) extends across said at least one first inflow opening;
   said first flow deflection region following said mixture producing region in said mixture flow direction (S) and deflecting the mixture of exhaust gas and reactant (R) flowing from said mixture producing region in a first flow deflection direction in said first flow direction;
   said second flow deflection region following said first flow deflection region in said mixture flow direction (S) wherein said mixture of exhaust gas and reactant (R) flows from said first flow deflection region to said second flow deflection region in a second flow direction opposite said first flow direction; and,
   a mixture dispensing region following said second flow deflection region in said mixture flow direction (S) and leading to said at least one first outflow opening.

2. The exhaust gas/reactant mixing arrangement of claim 1, wherein said mixture flow path has an S-shaped configuration.

3. The exhaust gas/reactant mixing arrangement of claim 1, wherein said reactant dispensing arrangement is arranged with respect to said at least one first inflow opening so that said reactant dispensing line (L) does not intersect said housing longitudinal axis (G).

4. The exhaust gas/reactant mixing arrangement of claim 1, wherein a plurality of said first outflow openings are provided and follow one another in a circumferential direction.

5. The exhaust gas/reactant mixing arrangement of claim 4, wherein a cross-sectional dimension of the first outflow openings decreases in a direction away from said mixture dispensing region.

6. The exhaust gas/reactant mixing arrangement of claim 1, further comprising:
   a first partition wall extending between said upstream end wall and said downstream end wall;
   a second partition wall extending between said upstream end wall and said downstream end wall;
   said first and second partition walls conjointly delimiting said mixture producing region and being arranged so as to place said at least one first inflow opening therebetween; and,
   said first partition wall shielding said at least one first outflow opening from direct inflow from said at least one first inflow opening.

7. The exhaust gas/reactant mixing arrangement of claim 6, wherein at least one of the following applies:
   a) said first partition wall starts from said housing wall and extends between said at least one first inflow opening and said at least one first outflow opening; and,
   b) said first partition wall defines a first flow deflection wall of said first flow deflection region.

8. The exhaust gas/reactant mixing arrangement of claim 6, further comprising a third partition wall extending between said upstream end wall and said downstream end wall; and, at least one of the following applies:
   a) said third partition wall provides a flow deflection wall of said second flow deflection region; and,
   b) said third partition wall and said first partition wall conjointly delimit said mixture dispensing region.

9. The exhaust gas/reactant mixing arrangement of claim 8, wherein said third partition wall extends along a circumferential region of said housing wall at a radial distance from said housing wall; and, said third partition wall and said housing wall conjointly delimit an exhaust gas flow space.

10. The exhaust gas/reactant mixing arrangement of claim 9, wherein said third partition wall separates said exhaust gas flow space from said mixing chamber; said upstream end wall has at least one second inflow opening provided therein; said first region of said exhaust gas duct is open to said exhaust gas flow space via said at least one second inflow opening; said downstream end wall has at least one second outflow opening provided therein; and, said exhaust gas flow space is open to said second region of said exhaust gas duct via said at least one second outlet opening.

11. The exhaust gas/reactant mixing arrangement of claim 10, wherein said at least one second inflow opening and said at least one second outflow opening are offset with respect to one another transversely with respect to said housing longitudinal axis (G) and do not mutually overlap.

12. The exhaust gas/reactant mixing arrangement of claim 9, wherein said exhaust gas flow space is open in a first circumferential region to said mixture producing region and is open in a second circumferential region to at least one of:
   a) said mixture dispensing region; and,
   b) said at least one first outflow opening.

13. The exhaust gas/reactant mixing arrangement of claim 12, wherein the third partition wall is formed integrally with said second partition wall.

14. An exhaust system for an internal combustion engine, the exhaust system comprising:
   an exhaust gas/reactant mixing arrangement for mixing exhaust gas and reactant (R), said exhaust gas/reactant mixing arrangement including:
      an exhaust gas guide housing defining a housing longitudinal axis (G) and extending along said longitudinal axis (G);
      said exhaust gas guide housing having a housing wall;
      an exhaust gas duct for passing exhaust gas therethrough;
      said exhaust gas duct being formed in said exhaust gas guide housing and surrounded by said housing wall;
      said exhaust gas guide housing having an upstream end wall and a downstream end wall arranged downstream of said upstream end wall;
      a mixing zone having a mixing chamber formed between said upstream and downstream end walls;
      a reactant dispensing arrangement supported on said exhaust gas guide housing and configured to dispense said reactant (R) into said mixing chamber along a reactant dispensing line (L) in a main reactant dispensing direction (H);
      said upstream end wall having at least one first inflow opening provided therein;
      said exhaust gas duct having a first region located upstream of said upstream end wall and said first region being open to said mixing chamber via said at least one first inflow opening;
      said downstream end wall having at least one first outflow opening provided therein;
      said exhaust gas duct having a second region located downstream of said downstream end wall and said second region being open to said mixing chamber via said at least one first outflow opening;
      a mixture flow path formed in said mixing chamber to lead from said at least one first inflow opening to said at least one outflow opening;
      said mixture flow path being configured to have first and second flow deflection regions following one another in a mixture flow direction (S); and,
      said first and second flow directions being arranged to deflect in mutually opposite directions;
         an SCR catalytic converter arrangement disposed downstream of said exhaust gas/reactant mixing arrangement;
         wherein said mixture flow path is configured to comprise therealong successively in said mixture flow direction (S):
            a mixture producing region located so as to cause said at least one first inflow opening to open to said mixture producing region to facilitate producing a mixture of exhaust gas and reactant (R) therein;
            said reactant dispensing arrangement being mounted to dispense reactant (R) into said mixture producing region and being arranged with respect to said at least one first inflow opening so that said reactant dispensing line (L) extends across said at least one first inflow opening;
            said first flow deflection region following said mixing producing region in said mixture flow direction (S) and deflecting the mixture of exhaust gas and reactant (R) flowing from said mixture producing region in a first flow deflection direction in said first flow direction; said second flow deflection region following said first flow deflection region in said mixture flow direction (S) wherein said mixture of exhaust gas and reactant (R) flows from said first flow deflection direction region to said second flow deflection region in a second flow direction opposite said first flow direction; and,
            a mixture dispensing region following said second flow deflection region in said mixture flow direction (S) and leading to said at least one first outflow opening.

15. The exhaust system of claim 14, wherein an exhaust gas treatment unit is arranged upstream with respect to said exhaust gas/reactant mixing arrangement.

16. The exhaust system of claim 15, wherein said exhaust gas treatment unit is a particle filter arrangement.

* * * * *

UNITED STATES PATENT AND TRADEMARK OFFICE
CERTIFICATE OF CORRECTION

| | |
|---|---|
| PATENT NO. | : 11,702,974 B2 |
| APPLICATION NO. | : 17/723125 |
| DATED | : July 18, 2023 |
| INVENTOR(S) | : Kast et al. |

It is certified that error appears in the above-identified patent and that said Letters Patent is hereby corrected as shown below:

In the Specification

In Column 8:
Line 5: delete "oufflow" and insert -- outflow -- therefor.
Line 18: delete "oufflow" and insert -- outflow -- therefor.

Signed and Sealed this
Fourteenth Day of November, 2023

Katherine Kelly Vidal
*Director of the United States Patent and Trademark Office*